3,586,688
CERTAIN AMINOPYRIDINECARBONYL GUANIDINES
Edward J. Cragoe, Jr., Lansdale, Pa., assignor to Merck & Co., Inc., Rahway, N.J.
No Drawing. Filed Dec. 18, 1968, Ser. No. 784,890
Int. Cl. C07d 31/44
U.S. Cl. 260—295                                9 Claims

ABSTRACT OF THE DISCLOSURE (Vic.-aminopyridinecarbonyl)guanidine products which exhibit saluretic and diuretic properties and more importantly are antikaluretic, are described. These compounds are prepared by reaction of a lower alkyl ester of the select vic.-aminopyridine carboxylic acid and a guanidine.

---

This invention is concerned with (vic.-aminopyridinecarbonyl)guanidines as well as methods by which these novel compounds can be prepared. The compounds of this invention can be illustrated by the structural formula

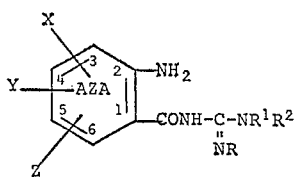

and includes the pharmaceutically acceptable salts thereof, especially the hydrochloride salts, wherein AZA represents an annular nitrogen atom occupying one of the positions other than those to which the amino and guanidinocarbonyl groups are attached, i.e., one of the positions 3, 4, 5 or 6; X represents hydrogen, halogen, particularly chloro or bromo, lower alkyl, and phenyl; Y represents hydrogen, halogen, particularly chloro or bromo, nitro, amino, lower alkyl and mononuclear-aryl, such as phenyl; Z represents hydrogen, lower alkyl, halogen, especially chloro or bromo, carbamoyl, lower (alkoxy-alkyl), and amino-lower alkyl; R is selected from hydrogen and lower alkyl; $R^1$ is selected from hydrogen and lower alkyl; and $R^2$ is selected from hydrogen, phenyl, lower alkyl or substituted lower alkyl wherein the substituent group or groups are selected from hydroxy, phenyl, halophenyl, especially chloro-, bromo-, and fluorophenyl, lower alkylphenyl, lower alkoxyphenyl; or $R^1$ and $R^2$ when lower alkyl can be linked together directly or through a hetero atom (preferably O or N) to produce with the nitrogen atom to which they are attached a 1-pyrrolidinyl, piperidino, morpholino or a 4-lower-alkylpiperazinyl group; and when R and $R^1$ are each lower alkyl they can be linked together to form the structure

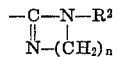

wherein $n$ represents the numeral 2 or 3.

In the above definitions the term lower alkyl preferably embraces an alkyl of from 1 to 5 carbon atoms arranged in a straight or branched chain configuration. Similarly, the term lower alkoxy preferably refers to a group having from 1 to 5 carbon atoms of straight or branched chain configuration. The term "vic." employed herein is the abbreviation for vicinal.

The compounds of this invention are useful because of their diuretic and saluretic, especially natriuretic properties. They differ from most of the known, effective diuretic agents, however, in that the products of this invention selectively enhance the excretion of sodium ions without causing an increase in excretion of potassium ions.

Since these novel compounds do not enhance potassium excretions, they have the decided advantage as diuretics of not causing muscular weakness which is brought about by many known diuretics that do enhance the excretions of this substance. In fact, with optimumly selected dosages it is possible to achieve potassium retention with compounds of this invention, thus eliminating net potassium ion loss when used in combination with kaluretic diuretics. As diuretic and natriuretic agents they can be used for the treatment of edema, hypertension and other diseases known to be responsive to this therapy.

As the products are effective when administered orally, they can be formulated by conventional methods into tablets, pills, capsules, elixirs and the like for administration at a dosage range from about 5 mgs. to about 150 mgs. or at a somewhat higher or lower dosage at the physician's discretion, advantageously on a 1 to 4 times a day regimen. If desired, the compounds also can be administered parenterally in physiologically acceptable fluids particularly in the form of their salts. Also, if desired, the compounds of this invention can be administered along with other therapeutic agents either in admixture or concurrently therewith.

The products advtantageously are prepared by the reaction of a lower alkyl ester of the selected vic.-aminopyridine carboxylic acid and guanidine or a substituted guanidine. The reaction preferably is carried out under anhydrous conditions either with or without a solvent such as a lower alkanol, methanol, ethanol or isopropyl alcohol being quite suitable for this purpose, or other solvents can be employed. While the reaction mixture preferably can be heated at temperatures up to and including reflux temperature of the reaction mixture, the reaction will take place at room temperature, although more time will be needed for completion of the reaction under these conditions.

It is possible to prepare certain (vic.-aminopyridinecarbonyl)guanidine derivatives containing a nuclear halogen by direct halogenation of the appropriate (vic.-amino-pyridinecarbonyl)guanidine. For example, treatment of an aqueous solution of (2-aminonicotinoyl)guanidine hydrobromide with bromine affords (2-amino-5-bromonicotinoyl)guanidine.

The esters employed as starting materials advantageously are prepared by reacting the required acid with a lower alkanol in the presence of a mineral acid, preferably sulfuric acid. Other methods for preparing esters of vic.-aminopyridine carboxylic acids have been described in the literature and also can be employed to prepare the desired starting substance.

The following examples are illustrative of the methods by which the products of this invention can be prepared and are not to be considered as limiting the invention to the particular procedural conditions employed or to the particular compounds prepared thereby. All melting points are corrected values.

EXAMPLE 1

(2,6-dibromo-3-aminoisonicotinoyl)guanidine hydrochloride

Step A: Preparation of methyl 2,6-dibromo-3-aminoisonicotinoate.—To a solution of sodium acetate (4.0 g.; 0.049 mole) in acetic acid (45 ml.) is added methyl 3-aminoisonicotinoate (3.04 g.; 0.02 mole) and thereafter bromine (6.4 g.; 0.04 mole) in acetic acid (5 ml.) is added. After the addition is completed stirring is continued at room temperature for 30 minutes. The reaction mixture then is poured into water (150 ml.) and the resulting solid is collected and dried yielding 5.1 g. (84%) of methyl 2,6-dibromo-3-aminoisonicotinoate, M.P. 110–112° C. Recrystallization from hexane does not change the melting point.

Analysis.—Calculated for $C_7H_6Br_2N_2O_2$ (percent): C, 27.13; H, 1.95; N, 9.04. Found (percent): C, 27.64; H, 2.08; N, 9.11.

Step B: Preparation of (2,6-dibromo-3-aminoisonicotinoyl)guanidine hydrochloride.—Sodium (0.46 g.; 0.02 mole) is dissolved in anhydrous methanol (50 ml.) and guanidine hydrochloride (2.1 g.; 0.02 mole) is added. The mixture is refluxed for 30 minutes, cooled and treated with methyl 2,6-dibromo-3-aminoisonicotinoate (3.1 g.; 0.01 mole). The mixture is refluxed for one hour, cooled and poured into water (150 ml.). The resulting yellow solid is collected and dried yielding 1.4 g. (38%) of product, M.P. 222–225° C. (dec.). This product then is suspended in water, dissolved by the addition of dilute hydrochloric acid and then precipitated by addition of concentrated hydrochloric acid to give (2,6-dibromo-3-aminoisonotinoyl) guanidine hydrochloride, M.P. 281.5–283.5° C.

Analysis.—Calculated for $C_7H_8Br_2ClN_5O$ (percent): C, 22.52; H, 2.16; N, 18.75. Found (percent): C, 22.77; H, 2.31; N, 18.39.

EXAMPLE 2

(2-amino-5-nitronicotinoyl)guanidine

Step A: Preparation of methyl 2-amino-5-nitronicotinoate.—To a solution of concentrated sulfuric acid (63 ml.) in anhydrous methanol (315 ml.) is added 2-amino-5-nitronicotinic acid (25.0 g.; 0.1365 mole). The resulting yellow solution is heated under reflux and protected from atmospheric moisture for 88 hours. The reaction solution then is cooled and poured into cold water (875 ml.). Solid sodium bicarbonate is added until the reaction mixture tests basic to litmus paper. The light yellow solid that forms is collected by filtration, washed thoroughly with water and dried yielding 21.96 grams of product, M.P. 192.5–195.5° C. Recrystallization of this product from toluene provides 18.67 g. (69%) of methyl 2-amino-5-nitronicotinoate in the form of yellow prisms, M.P. 195–196.5° C.

Analysis.—Calculated for $C_7H_7N_3O_4$ (percent): C, 42.64; H, 3.58; N, 21.31. Found (percent): C, 42.72; H, 3.40; N, 21.62.

Step B: Preparation of (2-amino-5-nitronicotinoyl) guanidine.—Sodium (2.88 g.; 0.125 mole) is dissolved in anhydrous methanol (50 ml.) and guanidine hydrochloride (13.14 g.; 0.1375 mole) is added. The mixture is stirred at room temperature for 30 minutes and the solid that forms is removed by filtration. The filtrate is concentrated to a paste under reduced pressure, treated with finely ground methyl 2-amino-5-nitronicotinoate (4.93 g.; 0.025 mole) and then allowed to stand at room temperature for 16 hours. The reaction mixture then is triturated with water, filtered and thoroughly washed with water. The resulting solid is suspended in boiling water (200 ml.), treated with 6 N hydrochloric acid and filtered to remove an insoluble portion. The filtrate is chilled to obtain the (2-amino-5-nitronicotinoyl)guanidine hydrochloride. The salt is dissolved in boiling water by adding 6 N hydrochloric acid and the desired product obtained by chilling the solution. The salt can be further purified by repeating this procedure. The product then is suspended in water, the suspension made strongly basic by the addition of concentrated sodium hydroxide and the resulting solid separated by filtration, washed with water and dried to give 1.02 g. (18%) of (2-amino-5-nitronicotinoyl)guanidine, M.P. >350° C. Further recrystallizations from a mixture of water and dimethylformamide does not change the melting point.

Analysis.—Calculated for $C_7H_8N_6O_3$ (percent): C, 37.50; H, 3.60; N, 37.49. Found (percent): C, 37.73; H, 3.84; N, 37.70.

EXAMPLE 3

(2,5-diaminonicotinoyl)guanidine

Step A: Preparation of methyl 2,5-diaminonicotinoate.—A mixture of methyl 2-amino-5-nitronicotinoate (10.0 g.; 0.0507 mole), from Example 2, Step A, anhydrous methanol (300 ml.) and 5% palladium on charcoal (1 g.) is shaken with hydrogen until the theoretical amount of gas is absorbed. The catalyst then is removed by filtration and the filtrate evaporated at reduced pressure to give 8.32 g. of methyl 2,5-diaminonicotinoate, M.P. 134–137° C. Recrystallization from toluene gives 7.76 g. (93%) of the ester in the form of orange prisms, M.P. 137.5–138.5° C.

Analysis.—Calculated for $C_7H_9N_3O_2$ (percent): C, 50.29; H, 5.43; N, 25.14. Found (percent): C, 50.68; H, 5.54; N, 25.65.

Step B: Preparation of (2,5-diaminonicotinoyl)guanidine.—Sodium (4.96 g.; 0.2155 mole) is dissolved in anhydrous methanol (75 ml.) and guanidine hydrochloride (22.65 g.; 0.2371 mole) is added. The mixture is stirred at room temperature for 15 minutes and the solid that separates then is removed by filtration. The filtrate is concentrated to a paste under reduced pressure, pulverized methyl 2,5-diaminonicotinoate (7.2 g.; 0.0431 mole) is added and the mixture allowed to stand at room temperature for 16 hours. The solid reaction mixture then is ground in a mortar with isopropyl alcohol (50 ml.) and treated with water (3 ml.). The brown solid that forms is collected by filtration, washed with isopropyl alcohol (10 ml.) and dried yielding 8.64 g. of product, M.P. >350° C. Two recrystallizations of the product from water provides 5.80 g. (69%) of (2,5-diaminonicotinoyl) guanidine in the form of brown needles, M.P. >350° C.

Analysis.—Calculated for $C_7H_{10}N_6O$ (percent): C, 43.29; H, 5.19; N, 43.28. Found (percent): C, 43.27; H, 5.52; N, 43.52.

EXAMPLE 4

(2,5-diaminonicotinoyl)guanidine

This product also can be prepared by catalytic reduction of (2-amino-5-nitronicotinoyl)guanidine, following essentially the same procedure described in Step A of Example 3.

EXAMPLE 5

(2-aminonicotinoyl)guanidine

This product is prepared by essentially the same procedure described in Example 1, Step B, except the methyl 2,6-dibromo-3-aminoisonicotinoate is replaced by an equivalent quantity of methyl 2-aminonicotinoate. There is thus obtained 1.5 g. (29%) of (2-aminonicotinoyl)-guanidine, M.P. >300° C.

Analysis.—Calculated for $C_7H_9N_5O$ (percent): C, 46.91; H, 5.06; N, 39.08. Found (percent): C, 47.21; H, 5.28; N, 38.92.

EXAMPLE 6

(2-amino-5-bromonicotinoyl)guanidine (2-aminonicotinoyl)guanidine (1.5 g.; 0.0084 mole., prepared as described in Example 5, is suspended in water (50 ml.) and sufficient dilute hydrobromic acid is added to effect solution. A solution of bromine (1.57 g.; 0.0098 mole) in acetic acid (4 ml.) is added with stirring and the resulting solid is collected and dried yielding 1.0 g. (46%) of 2-amino-5-bromonicotinoyl)-guanidine, M.P. >290° C. The compound is purified by dissolving in dilute hydrochloric acid, filtering and reprecipitating by the addition of dilute sodium hydroxide to provide product melting at >290° C.

Analysis.—Calculated for $C_7H_8BrN_5O$ (percent): C, 32.57; H, 3.12; N, 27.13. Found (percent): C, 32.26; H, 3.36; N, 26.97.

EXAMPLE 7

(3-amino-6-bromopicolinoyl)guanidine

Step B: Preparation of (3-amino-6-bromopicolinoyl)-ate.—Ethyl 3-aminopicolinoate (2.1 g.; 0.0126 mole) is suspended in water (30 ml.) and dissolved by adding a few drops of dilute sulfuric acid. To the stirred solution, bromine (2.02 g.; 0.0126 mole) in acetic acid (5 ml.) is added dropwise. After the addition of bromine is complete, the reaction mixture is made slightly basic with aqueous sodium hydroxide solution and the resulting solid is collected and dried yielding 2.0 g. (65%) of ethyl 3-amino-6-bromopicolinoate, M.P. 175.5–178.5° C. Recrystallization from 50% ethanol gives material melting at 181.5–183.5° C.

*Analysis.*—Calculated for $C_8H_9BrN_2O_2$ (percent): C, 39.21; H, 3.71; N, 11.43. Found (percent): C, 39.23; H, 3.82; N, 11.46.

Step B: Preparation of (3-amino-6-bromopicolinoyl)-guanidine. This compound is prepared by essentially the same procedure described in Example 1, Step B, except the methyl 2,6-dibromo-3-aminoisonicotinoate is replaced by an equivalent quantity of ethyl 3-amino-6-bromo-picolinoate. There is thus obtained 4.5 g. (67%) of (3-amino-6-bromopicolinoyl)guanidine, M.P. 175.5–178.5° C. (dec.). The product is purified by dissolving in dilute hydrochloric acid and by reprecipitating with dilute sodium hydroxide. After the process is repeated a second time the product melts at 179.5–180.5° C. (dec.).

*Analysis.*—Calculated for $C_7H_8BrN_5O$ (percent): C, 32.57; H, 3.12; N, 27.13. Found (percent): C, 32.32; H, 3.35; N, 26.99.

Additional (vic. - aminopyridinecarbonyl)guanidine products can be prepared by the methods hereinabove described, and particularly the process described in Example 1, Step B. The products "C" identified in Tables I through IV can be prepared by this procedure by replacing the methyl 2,5-dibromo-3-aminoisonicotinoate and the guanidine used in Step B of Example 1 by an equivalent quantity of the (vic.-aminopyridine) carboxylic acid, "A," and guanidine, "B," identified in each table. It will be understood that the tables are only representative of products of this invention that can be prepared by the methods described above and are not to be considered exhaustive thereof.

TABLE I

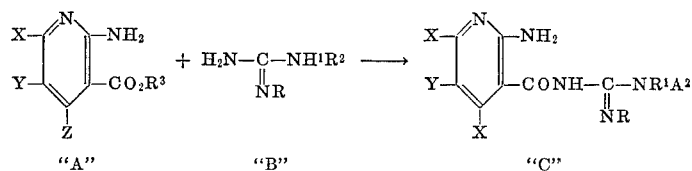

| Example No. | X | Y | Z | R³ | R | R¹ | R² |
|---|---|---|---|---|---|---|---|
| 8 | —CH₃ | H | —CH₃ | —C₂H₅ | H | H | —CH₂CH₂OH |
| 9 | H | H | Cl | —CH₃① | CH₂CH₂ | H | |
| 10 | —CH₃ | H | H | —C₂H₅ | H | —CH₃ | —CH₃ |
| 11 | —C₆H₅ | H | H | —C₂H₅ | H | H | CH₃ |
| 12 | —C₆H₅ | H | —CH₃ | —C₂H₅ | H | H | (CH₂)₂—C₆H₅ |
| 13 | —CH₃ | Br | —CH₃ | —CH₃① | H | H | —CH₂—C₆H₅ |
| 14 | —CH₃ | —CH₃ | H | —C₂H₅ | H | H | H |
| 15 | H | —CH₃ | H | —CH₃① | H | H | CH₂CH₂OH |
| 16 | —CH₃ | —CH₃ | —CH₃ | —C₂H₅ | H | H | —CH₂CH₂OH |
| 17 | —CH₃ | H | —CONH₂ | —C₂H₅ | H | H | —C₆H₅ |
| 18 | —CH₃ | H | —CH₂OC₂H₅ | —CH₃① | H | —(CH₂)₃CH₃ | —(CH₂)₃CH₃ |
| 19 | H | H | Cl | —CH₃① | H | H | CH₃ \| CH—C₆H₅ |
| 20 | —CH₃ | Br | —CH₃ | —CH₃① | H | —CH₃ | —CH₂—C₆H₅ |
| 21 | H | H | Cl | —CH₃① | H | (CH₂)₅ | |
| 22 | H | H | Cl | —CH₃① | H | (CH₂)₂—CH—(CH₂)₂ \| CH₃ | |

See footnotes at end of Table IV.

TABLE II

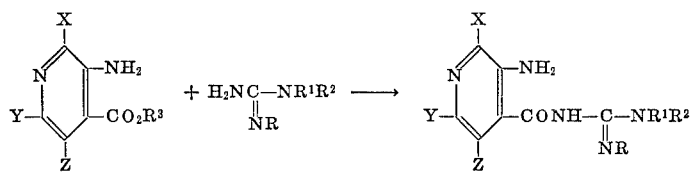

| Ex. No. | X | Y | Z | R³ | R | R¹ | R² |
|---|---|---|---|---|---|---|---|
| 23 | H | H | H | —CH₃ | —CH₃ | —CH₃ | H |
| 24 | —CH₃ | —CH₃ | H | —CH₃ | H | —CH₃ | —CH₃ |
| 25 | —CH₃ | H | —CH₂NH₂ | —C₂H₅ | H | H | H |
| 26 | H | —CH₃ | H | —CH₃ | H | (CH₂)₄ | |
| 27 | —CH₃ | —C₆H₅ | H | —C₂H₅ | H | —C₂H₅ | C₂H₅ |
| 28 | —CH₃ | —CH₃ | H | —CH₃ | H | H | —CH₂—⟨C₆H₄⟩—OCH₃ |

TABLE III

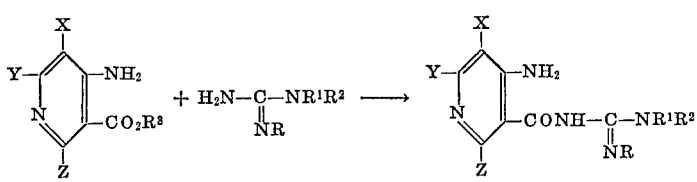

| Example No. | X | Y | Z | R³ | R | R¹ | R² |
|---|---|---|---|---|---|---|---|
| 29 | H | H | H | —CH₃ | H | H | (CH₂)₂—O—(CH₂)₂ |
| 30 | H | —CH₃ | H | —C₂H₅ | H | H | —CH₂CH₂OH |
| 31 | H | —CH₃ | H | —C₂H₅ | H | H | —CH₂—C₆H₄—CH₃ |
| 32 | H | H | H | —CH₃ | —CH₃ | —CH₃ | H |
| 33 | H | —CH₃ | H | —C₂H₅ | H | H | —CH₂—C₆H₄—F |

TABLE IV

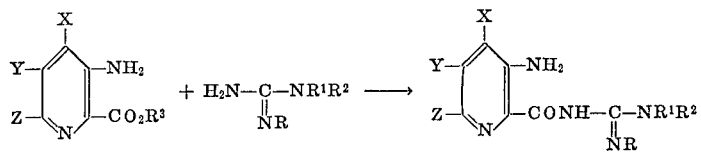

| Example No. | X | Y | Z | R³ | R | R¹ | R² |
|---|---|---|---|---|---|---|---|
| 34 | H | H | H | —CH₃ ① | H | H | —CH₂—C₆H₄—Cl |
| 35 | H | H | —CH₃ | —CH₃ ① | H | H | —CH₂CH₂OH |
| 36 | H | —CH₃ | H | —CH₃ ① | (CH₂)₂ | | H |
| 37 | H | Cl | H | —CH₃ ① | —CH₃ | —CH₃ | H |
| 38 | H | Br | H | —CH₃ ① | H | H | —(CH₂)₂—C₆H₅ |
| 39 | H | NO₂ ② | H | —CH₃ ① | H | H | H |

① The methyl ester is prepared from the acid by the procedure described in Example 2, Step A.
② This product upon reduction by the procedure described in Examples 3 or 4 is converted to (3,5-diaminopicolinoyl)guanidine.

The products of this invention, as previously mentioned, can be formulated by conventional methods for oral or parenteral administration. It will be appreciated that the dosage of any individual compound will vary from that of another compound depending upon the relative potency of the selected product and also depending upon the age and weight of the particular patient and upon the particular ailment to be treated. For these reasons, formulations containing for example from 5 to 150 mgs. or more or less active ingredient can be made available for the symptomatic adjustment of the dosage to the individual patient by his physician. As each of the products of this invention can be formulated according to known, standard procedures, only one formulation will be provided for illustrative purpose.

EXAMPLE 40

Dry-filled capsule containing 50 mgs. of active ingredient

| | Mgs./capsule |
|---|---|
| (3-amino-6-bromopicolinoyl)guanidine | 50 |
| Lactose | 273 |
| Magnesium stearate | 2 |
| Mixed powders | 325 |

Mix the (3-amino-6-bromopicolinoyl)guanidine, lactose and magnesium stearate and reduce to a No. 60 mesh powder. Encapsulate, filling 325 mgs. in each No. 0 capsule.

While the above examples describe the preparation of certain compounds which are illustrative of the novel products of this invention, and certain specific dosage forms suitable for administering the products, it is to be understood that the invention is not to be limited to the specific reaction conditions for the preparation thereof nor by the specific ingredients included in the pharmaceutical preparation, but is to be understood to embrace variations and modifications thereof which fall within the scope of the appended claims.

What is claimed is:
1. A (vic.-aminopyridinecarbonyl)guanidine having the following structure

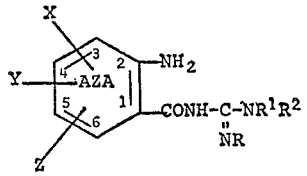

wherein in the foregoing structure

AZA is an annular nitrogen atom occupying one of the positions other than those to which the amino and guanidinocarbonyl groups are attached;

R, R¹ and R² are hydrogen;

X is selected from the group consisting of hydrogen, C1 to C5 straight chain alkyl and bromo;

Y is hydrogen or C1 to C5 straight chain alkyl;

Z is selected from the group consisting of hydrogen, C1 to C5 straight chain alkyl, chloro, bromo, linear alkoxyalkyl having up to 5 carbon atoms, nitro, amino and aminomethyl and the corresponding pharmaceutically acceptable salts thereof.

2. A (vic.-aminopyridinecarbonyl)guanidine as claimed in claim 1 wherein each of the variables R, R¹ and R² represents hydrogen.

3. (3-amino-6-bromopicolinoyl)guanidine.

4. (2-amino-5-bromonicotinoyl)guanidine.

5. (2-aminonicotinoyl)guanidine.

6. (2,5-diaminonicotinoyl)guanidine.

7. A (vic.-aminopyridinecarbonyl)guanidine as claimed in claim 1 wherein R and R¹ are each hydrogen and R² represents hydroxy-lower alkyl.

8. A (vic.-aminopyridinecarbonyl)guanidine as claimed in claim 1 wherein X is amino, Y is selected from chloro and bromo, and each of the variables Z, R, R¹ and R² represents hydrogen.

9. A compound as claimed in claim 1 wherein the (vic.-aminopyridinecarbonyl)guanidine is a (2-aminonicotinoyl)guanidine.

References Cited
UNITED STATES PATENTS

| | | | |
|---|---|---|---|
| 2,734,904 | 2/1956 | Burtner | 260—295 |
| 3,178,443 | 4/1965 | Mull | 260—295X |

ALAN L. ROTMAN, Primary Examiner

U.S. Cl. X.R.

260—247.2, 268, 294, 295.5; 424—248, 250, 266, 267